INVENTOR
ALBERT S. BRODHEAD
BY
Olsen & Stephenson
ATTORNEYS

INVENTOR
ALBERT S. BRODHEAD
BY Olsen & Stephenson
ATTORNEYS

United States Patent Office 3,783,078
Patented Jan. 1, 1974

3,783,078
METHOD AND APPARATUS FOR FORMING
HOLLOW PLASTIC ARTICLES
Albert S. Brodhead, Ann Arbor, Mich., assignor to
Thetford Corporation, Ann Arbor, Mich.
Filed Oct. 20, 1971, Ser. No. 190,971
Int. Cl. B32b 31/20
U.S. Cl. 156—499                7 Claims

ABSTRACT OF THE DISCLOSURE

A method and apparatus for vacuum forming hollow plastic articles from heat-fusible sheets of organic plastic materials. A pair of open frames are mounted on rails for transfer in close parallel relationship, each frame having clamps for holding at each end thereof a sheet of plastic material. Ovens into which the rails extend are located in spaced relation, and midway between the ovens is a forming station through which the rails pass and wherein sectional molds are provided which can close on two parallel sheets supported by the open frames. The frames are arranged so that two sheets, one in each oven, can be heated simultaneously while two other sheets are being formed at the same time in the sectional molds. Transfer means shuttle the frames between the ovens and the forming station.

BACKGROUND OF THE INVENTION

The present invention relates to the molding of hollow plastic articles and more particularly to a method of and apparatus for vacuum forming heat-fusible plastic sheets into such articles.

It is known to form hollow plastic articles from two horizontally disposed, spaced apart heat-fusible plastic sheets each supported in its own frame. The frames are initially moved into a heating oven for heating the sheets and then are moved to a forming station where vacuum mold sections close on the sheets and vacuum form the articles.

Numerous problems may arise when using prior art vacuum forming apparatus of this character. Initially, the cycle time for heating the sheets and forming the articles is excessive, and of greater importance, the apparatus is not readily usable for forming articles when it is desired to make the articles of sheets that are of different materials or thicknesses or when it is desired to heat one sheet for a longer time period or to a higher temperature than the other. Failure on the part of prior art apparatus to perform satisfactorily functions of this nature limits the applications that can be made of this apparatus or unduly raises the costs of articles so formed.

SUMMARY OF THE INVENTION

The present invention is directed to improvements in prior art vacuum forming apparatus and methods of vacuum forming plastic articles that have overcome the shortcomings noted above. Apparatus is provided which permits simultaneous but separate heating of two sheets of plastic material for individually selected time durations and at individually selected temperatures.

According to a preferred form of the present invention, apparatus is provided for forming two sheets of heat fusible plastic into a hollow structure comprising first and second frame means for supporting the edges of said sheets, each frame means being adapted to support at each of its ends one of said sheets. First and second heating means are located in spaced relation for receiving ends of the frame means for heating the sheets at those ends. First and second partible mold sections are located in the space between the heating means and have complementary edges and define when in closed positions a cavity in the shape of said hollow structure. The heating means and mold sections are arranged so that each heating means can receive one end of one frame means while the other end is positioned between the mold sections. Transfer means are provided for removal of the one end of the first frame means from the first heating means to a location between the mold sections and for removal of the other end of the first frame means from between the mold sections to the second heating means. The transfer means is also arranged for removal of the one end of the second frame means from the second heating means to a location between the mold sections and for removal of the other end of the second frame means from between the mold sections to the first heating means. Vacuum means are provided in each of the mold sections for drawing each sheet to the shape of its mold section, and means are provided for closing the mold sections to cause the heated sheets to be engaged at the complementary edges and to be fused together.

Rails extend between the first and second heating means and pass through the forming section for transferring the first and second frame means between the heating means and the forming station. The first and second frame means have frame portions at each end on which clamps are mounted for supporting the edges of the sheets. The frame portions of one of the frame means is smaller than the frame portion of the other frame means so that when the frame portions of the first and second frame means are in registry at the open mold sections, one of the mold sections can be advanced through the smaller frame portion to move the sheet supported thereby to the other sheet supported in the larger frame portion where the sheets can be engaged and fused together between said complementary edges. Thus, the two sheets which are intended for use in forming the structure are simultaneously heated in separate ovens while other sheets are being formed at the forming station. Because separate ovens are used, each sheet can be heated under optimum time and temperature conditions.

A method of forming hollow articles from two sheets of heat fusible plastic can be carried out with the apparatus described above comprising the steps of clamping the edges of two of said sheets in the first ends of first and second frames, introducing the first ends of the frames into and heating said sheets in separate heating means, clamping the edges of two additional sheets in the other ends of said first and second frames, transferring said first and second frames so that the first ends thereof in which the heated sheets are clamped are positioned between said mold sections and the other ends of the frames are positioned in said heating means, applying differential pressure to the surfaces of said sheets so that each heated sheet is formed to the shape of its mold section, pressing said formed sheets together to fuse the edges of the sheets, separating the mold sections and removing the article, clamping additional sheets in said first ends of said first and second frames, and repeating the cycle.

Thus, it is an object of the present invention to provide an improved method and apparatus for vacuum forming hollow plastic articles from heat fusible sheets of organic plastic materials.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENTS

Figure 1:
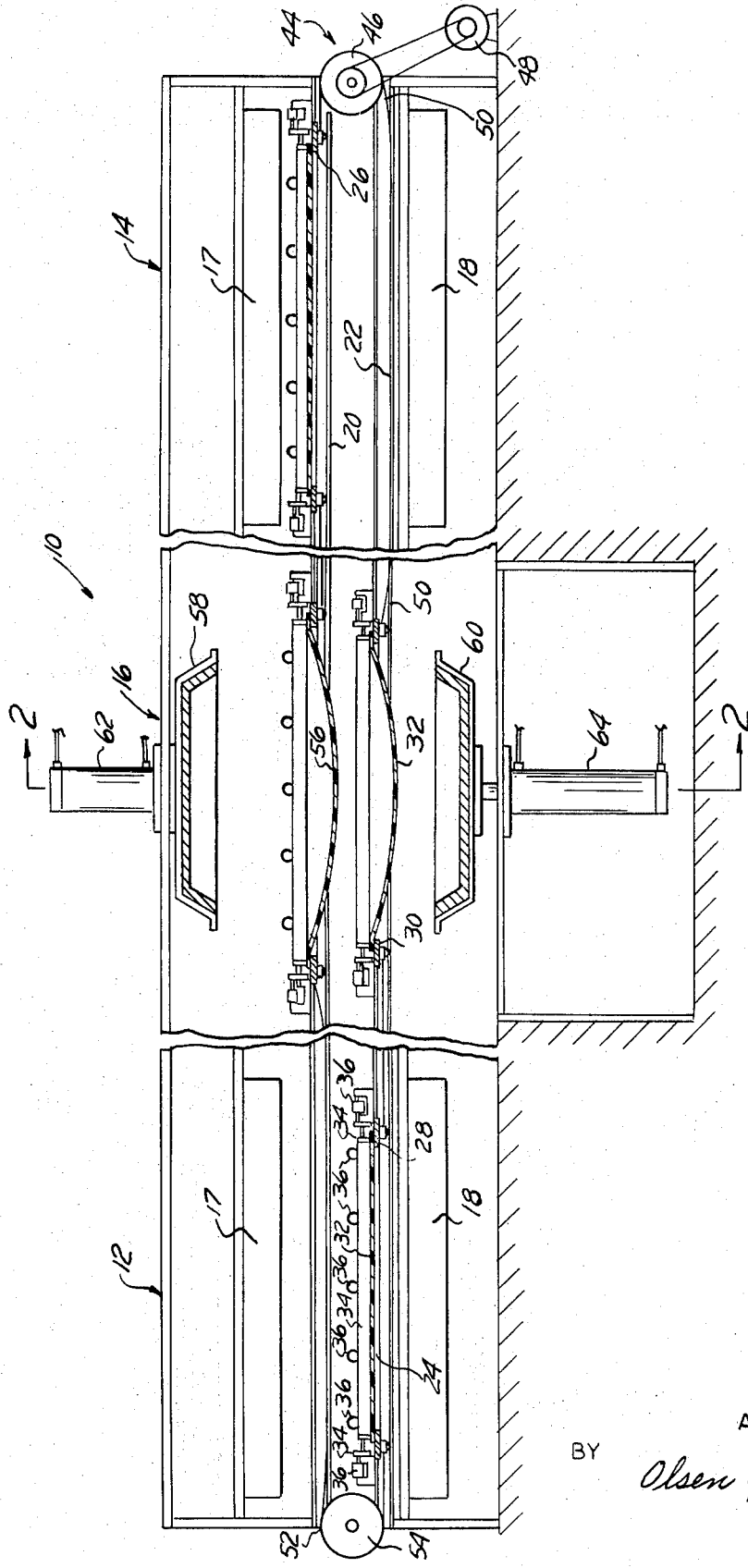
FIG. 1 is a front elevational view, partly in section, of apparatus embodying one form of the present invention.

Before explaining the present invention in detail, it is to be understood that the invention is not limited in its application to the details of construction and arrangement of parts illustrated in the accompanying drawings, since since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The thermoforming apparatus 10 has a first heating means or oven 12 and a second heating means or oven 14 in spaced relation, and centrally located between the heating means 12 and 14 is a forming station 16. Each heating means 12 and 14 has an upper heater 17 and a lower heater 18. Upper and lower transfer rails 20 and 22 extend longitudinally in parallel relation between the heating means 12 and 14 and pass through the forming station 16.

Adapted for travel on the lower transfer rails 22 is a first frame means 24, and adapted for travel on the upper transfer rails 20 is a second frame means 26. The frame means 24 and 26 are similar in construction, differing only in dimensions, and only details of frame means 24 will be described in detail.

The frame means 24 has a frame portion 28 at one end and a frame portion 30 at the other end, each frame portion being adapted to support a sheet of heat-fusible plastic 32 which is held in place by the clamps 34 which have a plurality of fluid cylinders 36 for actuating the same as will be described subsequently in greater detail in connection with FIG. 3. The frame means 24 has a plurality of wheels 38 which are adapted to travel on the transfer rails 22 for shuttling the frame means between the position shown in FIG. 1 wherein the one end or frame portion 28 is in the heating means or oven 12 while the other end or frame portion 30 is at the forming station 16, and a second position in which the other end or frame portion 30 is in the heating means or oven 14 and the frame portion or one end 28 is in the forming station 16.

In the position shown in FIG. 1, the one end or frame portion 28 has been introduced into the oven 12 but has not yet been heated so that the sheet of plastic 32 is still in a relatively rigid cold condition as shown, whereas the other end 30 has just been transferred from the heat-in means 14 after heating so that the sheet of plastic 32 sags as shown caused by the heating that has occurred in the heating means 14.

Figure 3:
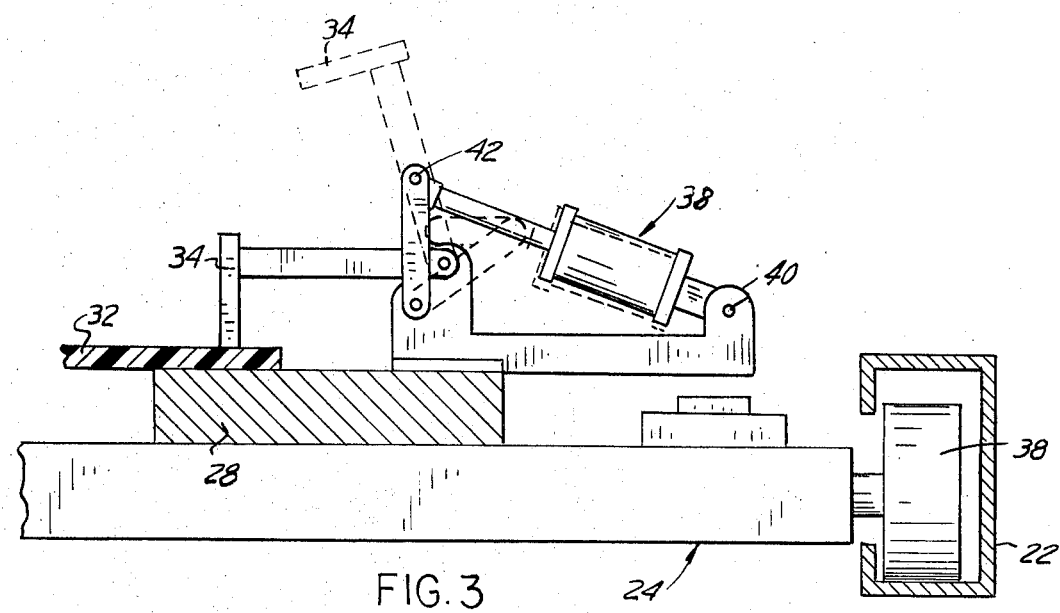
FIG. 3 is an enlarged fragmentary section showing details of one of the frame means.

Referring now to the FIG. 3, it will be noted that the fluid cylinder 36 is pivotally connected to the frame means 24 at 40, and the rod end of the fluid cylinder 36 is pivotally connected at 42 to a clamp linkage to permit movement of the clamp 34 from the position shown in solid lines to the position shown in broken lines. When in the broken line position a sheet of plastic 32 can be inserted in place after which the cylinder 36 can be actuated to move the clamp 34 to the position shown in solid lines for holding the sheet of plastic 32 on frame portion 28.

Figure 2:
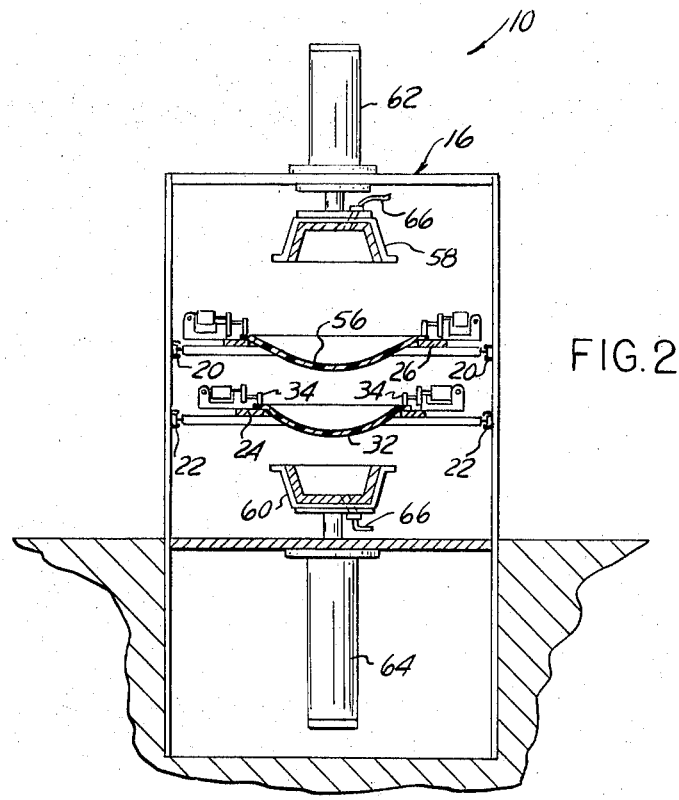
FIG. 2 is a vertical section taken on the line 2—2 of FIG. 1.

As previously indicated, the upper frame means 26 is the same as the lower frame means 24 with the exception of the dimensions of the frame portions at each end. As can be seen best in FIGS. 1 and 2, the frame means 24 has smaller internal dimensions of the frame portions than the internal dimensions of the frame portions of the upper frame means 26. In a manner to be described, this facilitates the movement of the heated plastic sheet from the lower frame to the upper frame during the forming operation at the forming station 16.

Mounted at one end of the thermoforming apparatus 10 is a transfer means 44 which has a transfer drive sprocket 46 driven from a reversible motor 48. The transfer drive sprocket 46 is drivingly connected to the ends of the frame means 24 and 26 by the chain 50. Another chain 52 connects the other ends of the frame means 24 and 26 and fit over the idler sprocket 54 so that turning of the reversible motor 48 in one direction will cause the one frame means 24 to travel or shuttle in one direction when the other frame means 26 is traveling or shuttling in the opposite direction. When the reversible motor is turned in the opposite direction, the two frame means 24 and 26 will shuttle in the reverse directions.

Suitable limit switches and timer means (not shown) are associated with the transfer means and the ovens 12 and 14 and are provided to permit movement of the frame means 24 and 26 at the proper times and to allow them to remain in the ovens for the proper duration of time.

The heating elements 17 and 18 in each of the ovens 12 and 14 are suitably designed to provide rapid heating and cooling so as not to interfere with the time cycle or desired heating for each sheet of plastic when introduced into the oven. Control circuits (not shown) permit heating at selected temperatures and for selected durations. Thus, if desired, the sheet of plastic 32 in the lower frame means 24 can be formed from one plastic material and the corresponding sheet 56 in the other frame means 26 can be formed of a different plastic material, or the plastic sheets can be of different weights or thicknesses so that different but optimum heating can be applied to each sheet when in its associated oven for heating purposes.

The forming station 16 has a pair of mold sections 58 and 60 which are adapted to be moved individually to the open positions shown in FIG. 1 by fluid cylinders 62 and 64 and to be moved individually to closed positions by the same fluid cylinders. The sectional molds 58 and 60 have complementary edges adapted for engagement and are conventional vacuum forming molds so that the individual sheets 42 and 56 can be formed within their respective cavities, as desired. For this purpose any conventional vacuum source such as at 66, FIG. 2, can be employed.

In the normal operation of the sectional molds, the lower mold section 60 will be advanced first, and in timed relation to this advance, the clamp means 34 will release the sheet 32 to permit the lower mold section 60 to advance toward the upper sheet 56 in a manner to be described.

Figure 4:
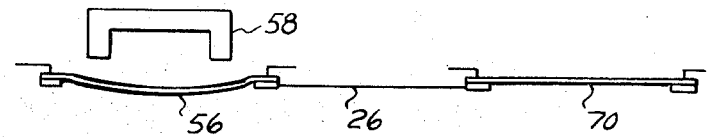
FIGS. 4-11 are a series of schematic illustrations of the steps employed in carrying out the method comprising the present invention.
Figure 4:
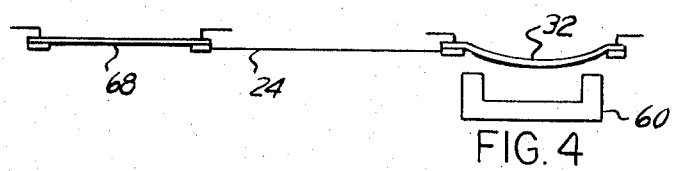

For a more detailed description of the method of operation of the thermoforming apparatus, attention is now directed to FIGS. 4-11, inclusive. These figures show schematically the positions of the frame means 24 and 26 and the mold sections 58 and 60 during different stages of operation. Referring first to FIG. 4, it will be noted that this figure illustrates schematically the location of the various movable parts corresponding to that shown in FIG. 1. At this time in the cycle, the mold sections 58 and 60 are open and have between them the sheets of plastic 32 and 56 which have been heated in preparation for the forming operation. Other sheets 68 and 70 are clamped respectively in the frame means 54 and 26 and are located in the heating means 12 and 14, not shown, where they can be heated during the forming operations that will be performed on the sheets 32 and 56.

Figure 5:
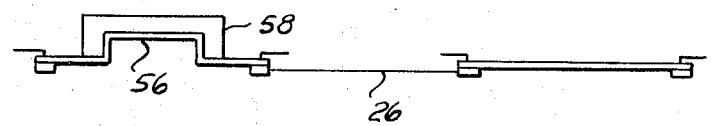
Figure 5:
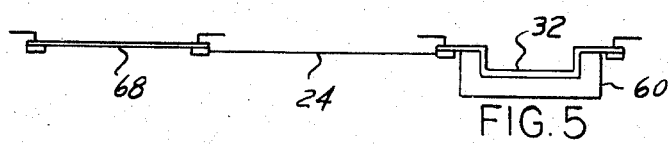

In FIG. 5 the mold sections 58 and 60 have been moved into engagement with the sheets 32 and 56 and by means of the vacuum source of 68, the sheets have been formed to the shape of the cavities of the mold sections 58 and 60.

Figure 6:
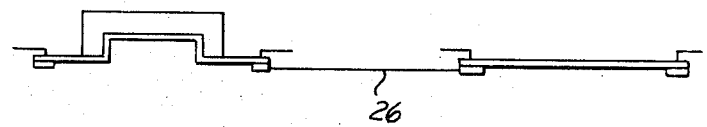
Figure 6:
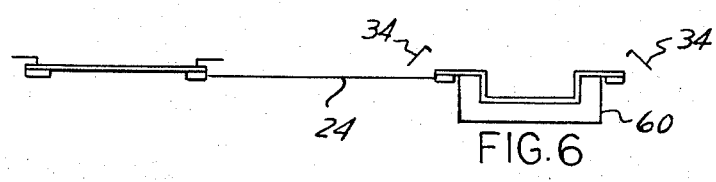
Figure 7:
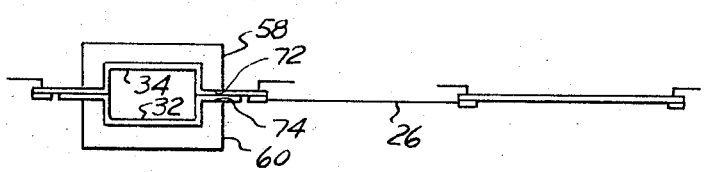
Figure 7:
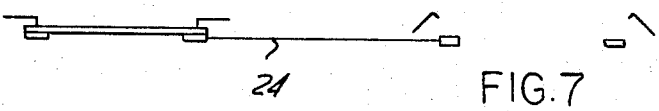

In the next step of operation, the clamps 34 of the lower frame means 24 are released, as shown in FIG. 6, after which the lower mold section is moved upwardly, as shown in FIG. 7, so that the complementary edges 72 and 74 of the mold sections 52 and 60 are pressed together to fuse the plastic sheets into a hollow structure. It is to be noted in this sequence of operation that the smaller internal opening in the frame portion of the lower frame means 24 allows a smaller sheet of plastic to be used so that when the lower sheet is moved upwardly clearance is provided to permit ready fusing of the two sheets together without interference from the clamps 34 or other portions of the two parallel frame means 24 or 26.

Figure 8:
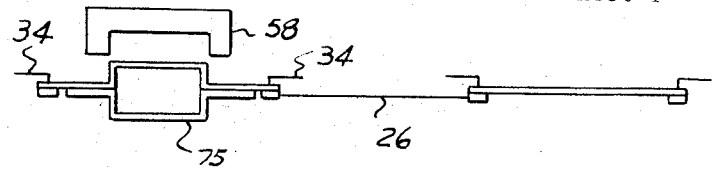
Figure 8:
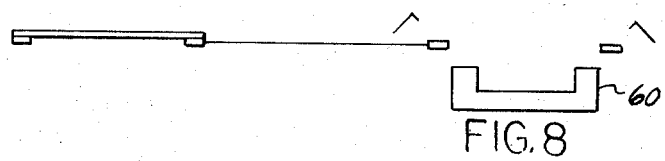
Figure 9:
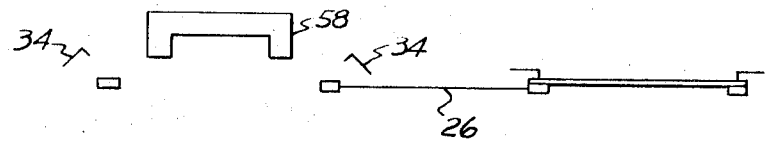
Figure 10:
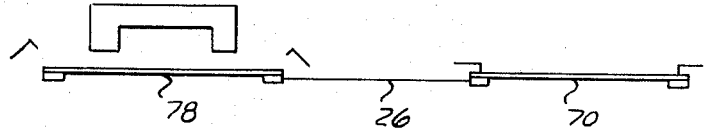
Figure 11:
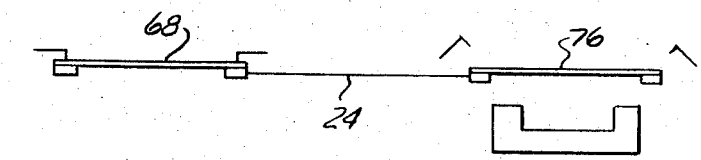
Figure 11:
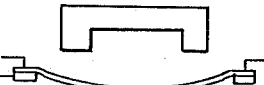

Referring now to FIG. 8, it will be seen that the mold sections 58 and 60 can now be moved to their open positions leaving a hollow structure 75 retained in position by the clamps 34 of the upper frame means 26. As shown in FIG. 9, the clamps 34 can then be released and the hollow structure will be removed with the mold sections 58 and 60 remaining in their open positions and the clamps 34 also in open positions in readiness to receive new sheets of plastic material 76 and 78 as shown in FIG. 10. During these operations the sheets 68 and 70 have been in the oven or heating means 12 and 14, and the frame means 24 and 26 can now be shuttled to the reverse positions of that shown in FIG. 10, wherein the heated sheets 68 and 70 are moved into the forming apparatus 16 and the new sheets 68 and 70 are transferred into the heating means 12 and 14 for heating as shown in FIG. 11. The cycle is now repeated to form the sheets 68 and 70 into a new hollow structure.

From the foregoing description it will be readily apparent that the transfer means 44 can be used to shuttle the frame means 24 and 26 intermittently between the two ovens 12 and 14 and the forming station 16 so that hollow structures 76 are repeatedly being formed while new sheets are being heated in the ovens 12 and 14. It will also be recognized that the two sheets in the upper and lower frames need not be of the same material or of the same thickness of material, but can be materials which require heating for different durations of time and at different temperatures. Limit switches and suitable timer, temperature and control circuits (not shown) are present which govern the length of time that the upper and lower sheets of plastic are heated and also the temperature at which they are heated. By virtue of this construction and arrangement and the method of operation described, a variety of different types of hollow structures can be formed rapidly and a substantially number or different applications can be made using the apparatus of this invention.

It is claimed:

1. Apparatus for forming two sheets of heat-fusible plastic into a hollow structure comprising first and second frame means for supporting the edges of said sheets, each frame means being adapted to support at each of its ends one of said sheets, first and second heating means in spaced relation for receiving ends of said frame means for heating the sheets at those ends, first and second partible mold sections located in the space between said heating means and having complementary edges and defining when in closed positions a cavity in the shape of said hollow structure, said heating means and mold sections being arranged so that each heating means can receive one end of one frame means while the other end is positioned between said mold sections, transfer means (1) for removing the one end of the first frame means from the first heating means to a location between the mold sections and for removing the other end of the first frame means from between the mold sections to the second heating means and (2) for removing the one end of the second frame means from the second heating means to a location between the mold sections and for removing the other end of the second frame means from between the mold sections to the first heating means, means for reducing the pressure between the heated sheets and their respective mold sections so that the sheets are urged into the mold sections, and means for closing said mold sections to cause the heated sheets to be engaged at said complementary edges and to be fused together, said first and second frame means having frame portions at each end and clamps mounted thereon for supporting the edges of said sheets, and the frame portions of one of said frame means being smaller than the frame portions of the other frame means so that when the frame portions of the first and second frame means are in registry at the open mold sections, one of said mold sections can be advanced through the smaller frame portion to move the sheet supported thereby to the other sheet supported in the larger frame where the sheets can be engaged and fused together between said complementary edges.

2. Apparatus that is defined in claim 1, wherein the mold closing means is initially operable to move said mold sections from their open positions toward one another into engagement with said sheets, and the pressure-reducing means is operable to induce said sheets to form in their associated mold sections, said mold closing means then being operable to advance said one mold section toward the other mold section to fuse the formed sheets together.

3. Apparatus that is defined in claim 1, wherein the frame portions that are smaller are located below the frame portions of the other frame means.

4. Apparatus that is defined in claim 1, wherein rails extend between said first and second heating means, and said first and second frame means are supported for transfer on said rails.

5. Apparatus that is defined in claim 4, wherein said rails are arranged so that said first and second frame means are transferred in opposite directions in parallalism.

6. Apparatus that is defined in claim 5, wherein said mold sections are mounted for movement normal to the parallel paths of movement of said first and second frame means.

7. Apparatus that is defined in claim 6, wherein a pair of rails support each of said frame means, and said and said mold sections are mounted for movement to closed positions between the pairs of rails.

References Cited
UNITED STATES PATENTS

| | | | |
|---|---|---|---|
| 3,597,799 | 8/1971 | Earle | 425—109 |
| 3,539,416 | 11/1970 | Sanders et al. | 156—242 |
| 3,412,183 | 11/1968 | Anderson et al. | |
| 3,398,434 | 8/1968 | Alesi et al. | 425—109 |

ALFRED L. LEAVITT, Primary Examiner

C. B. WESTON, Assistant Examiner

U.S. Cl. X.R.

156—285, 382; 425—109